United States Patent [19]

Cyphelly

[11] Patent Number: 4,577,739
[45] Date of Patent: Mar. 25, 1986

[54] HYDROSTATIC CLUTCH

[75] Inventor: Ivan J. Cyphelly, Gran Canaria, Spain

[73] Assignee: Glyco-antriebstechnik GmbH, Wiesbaden, Fed. Rep. of Germany

[21] Appl. No.: 558,164

[22] Filed: Dec. 5, 1983

[30] Foreign Application Priority Data

Dec. 4, 1982 [DE] Fed. Rep. of Germany ....... 3244980

[51] Int. Cl.⁴ ............................................. F16D 31/04
[52] U.S. Cl. ..................................... 192/61; 192/58 R
[58] Field of Search .............. 192/61, 58 R; 188/292, 188/294

[56] References Cited

U.S. PATENT DOCUMENTS

| | | | |
|---|---|---|---|
| 2,475,700 | 7/1949 | Dickens | 192/61 |
| 2,932,991 | 4/1960 | Zierick | 192/58 R X |
| 3,397,598 | 8/1968 | Zierick | 192/61 X |
| 3,896,912 | 7/1975 | Cyphelly | 192/61 |

*Primary Examiner*—Rodney H. Bonck
*Attorney, Agent, or Firm*—Karl F. Ross; Herbert Dubno

[57] ABSTRACT

A hydrostatic clutch of the type in which an input shaft has a casing in which a positive displacement gear pump is received and an output shaft is connected to the gear pump. According to the invention the gear pump includes a gear pump body provided with intake and pressure passages, the body being limitedly rotatable in the casing so that upon reversal of the rotation of the input shaft, the passages of the body will switch over as to communication with openings of the casing and thereby reverse the pump.

12 Claims, 4 Drawing Figures

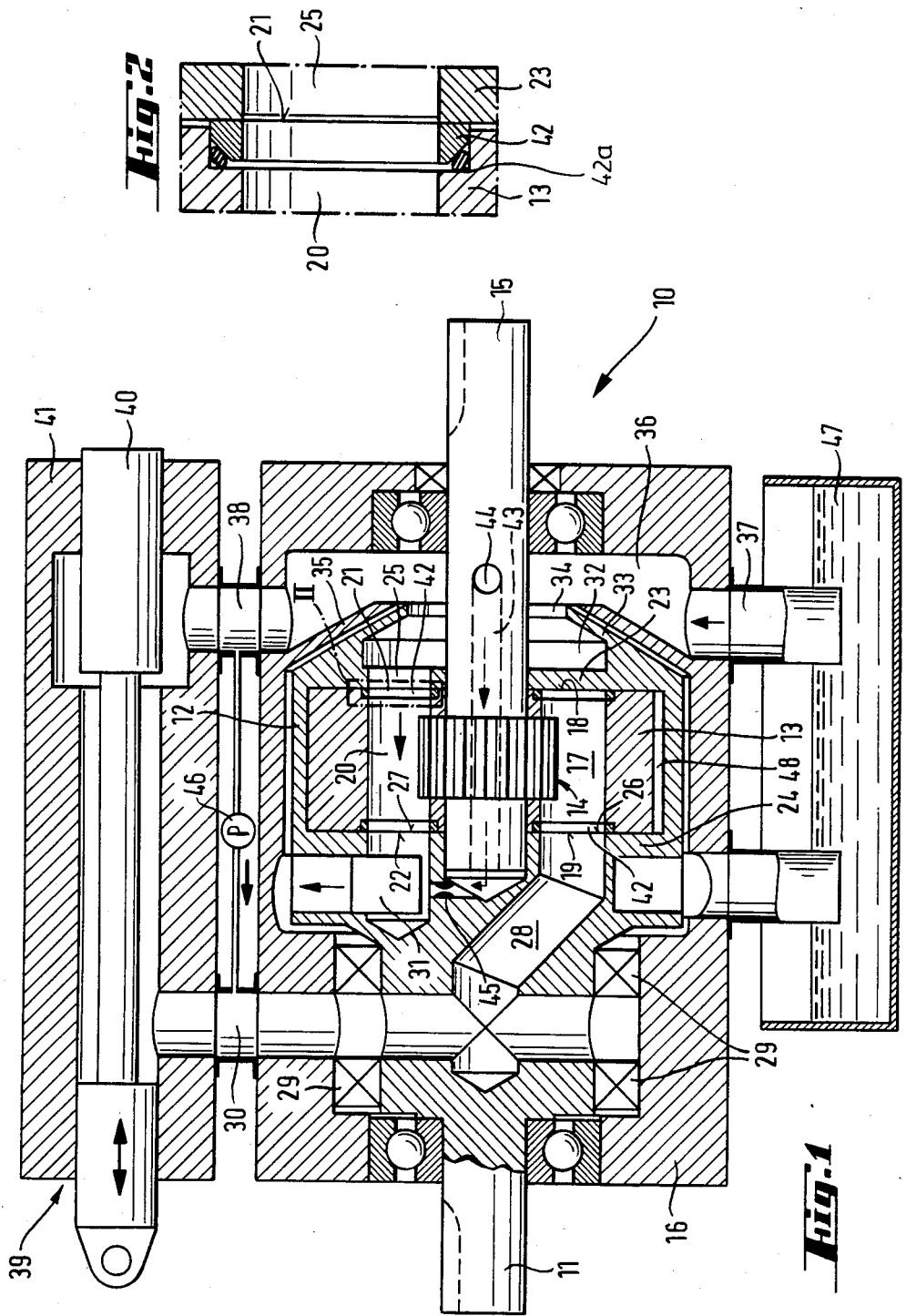

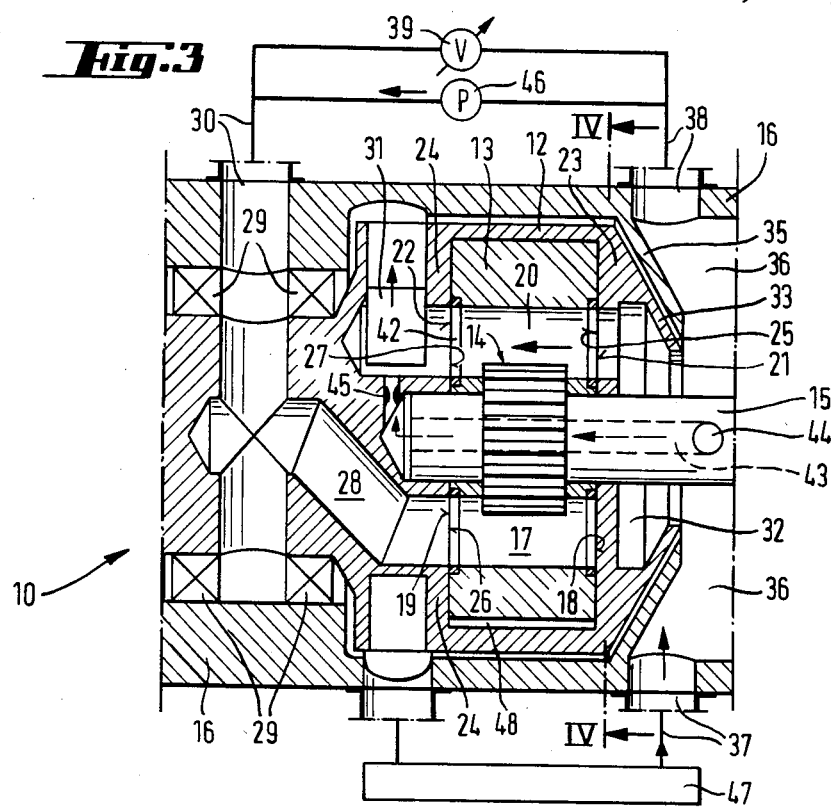
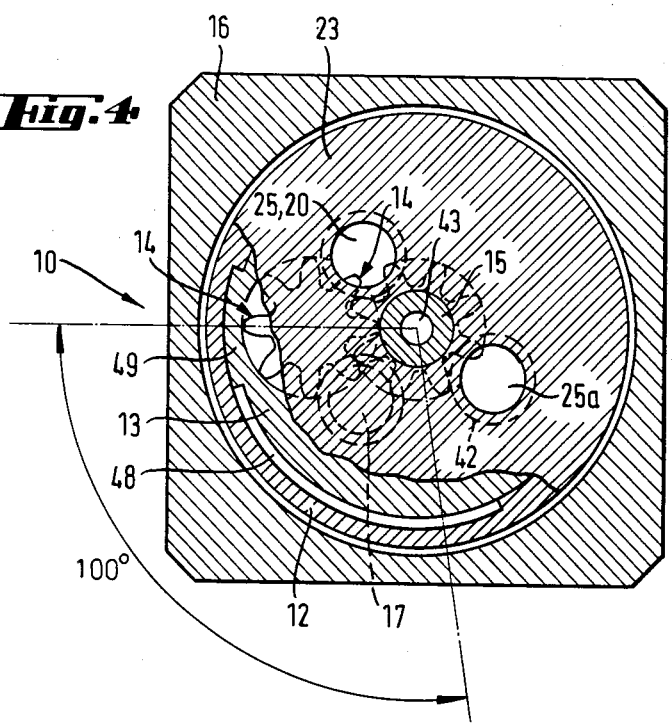

HYDROSTATIC CLUTCH

FIELD OF THE INVENTION

My present invention relates to a switchable hydrostatic clutch and, more particularly to a clutch of the type in which a positive displacement gear pump is utilized to couple input and output shafts.

BACKGROUND OF THE INVENTION

In German Pat. No. 24 19 053 and U.S. Pat. No. 3,896,912, hydrostatic clutches are described which utilize a positive displacement gear pump to couple the input and output shafts.

In these clutches, a fluid path is established through the positive displacement gear pump which is controlled in part by a valve so that when flow along this path is blocked, one clutch operation state is defined while, when flow is permitted, the second clutch operating state effects ensured. The valve is preferably a stepless control of throttling from zero flow to a maxiumum flow position and means are provided to permit flushing of the pump with fluid when the valve is in a fully blocking position. While such clutches have been found to be highly effective because they allow coupling of the two shafts with reduced residual torque and slip, the prior art clutches of this type have been found to be effective only in one rotation sense.

OBJECT OF THE INVENTION

It is the principal object of the present invention to provide a switchable hydrostatic clutch of the aforedescribed type which, while being of simple construction and reliable operation, is effective for rotation in opposite senses of the drive shaft and, indeed, which will allow switchover of the direction of operation without adversely affecting the operating parameters otherwise.

SUMMARY OF THE INVENTION

The basic elements of the clutch of the invention, as in the prior art clutch, are an input shaft, an output shaft, a clutch housing in which these shafts are journaled, a casing on one of these shafts defining a chamber in which a positive displacement gear pump is provided, the gear pump being connected to the other shaft, means in the housing defining an intake compartment for a fluid which communicates with a suction side of the gear pump, means in the casing forming a passage communicating with a pressure side of the gear pump, and a throttle valve between the compartment and the latter means for controlling the flow of the hydraulic fluid through the gear pump.

According to the present invention, the aforementioned object is achieved by providing the gear pump with a pump body which is rotatable limitedly about an axis within the aforementioned casing so as to enable the relative rotation of the pump body and the casing to switch over the suction and pressure sides of the pump and hence effectively directionally reverse the operation of the latter.

According to a feature of the invention the casing is connected to the drive shaft and encloses the pump body and means is provided between the pump body and the casing to enable relative angular displacement of the pump body and the casing through an angle less than a full rotation.

At the axial end of the casing which is not secured to the drive shaft, this casing forms an intake passage of the smallest possible cross section consistent with not limiting the flow and with not markedly increasing the flow cross section for delivery of fluid to the pump, this passage directly surrounding the pump shaft.

With the arrangement of the present invention, a simple rotation of the pump housing in the casing can bring about alignment of the intake and pressure passages of the pump housing with the passages of the casing so as to reverse the direction of flow through the pump and thus, upon reversal of the drive direction of the input shaft, operate the output shaft in the opposite sense.

The valving for this switchover can be effected solely by planar active surfaces which are perpendicular to the axis of the shafts and the pump body and, as a result no complex valving system is necessary. Cavitation and like undesirable effects are eliminated.

While in the preferred embodiment of the invention, one of the juxtaposed walls forming the valve structure can be provided with shear rings as additional sealing members around the respective opening, it is also possible to conceive of an embodiment in which the counter-rotation of the pump body and the casing can operate a slide valve system or the like.

The system of the invention also greatly improves the flushing characteristics by providing that the pump shaft can have a passage which communicates between the aforementioned compartment and a flushing or secondary pump of the casing so that a continuous flow through the positive displacement pump is ensured. According to the invention, the downstream side of the casing can be provided with the secondary pump which can be connected to a flushing passage in this casing.

BRIEF DESCRIPTION OF THE DRAWING

The above and other objects, features and advantages of the present invention will become more readily apparent from the following description, reference being made to the accompanying drawing in which:

FIG. 1 is an axial cross-sectional view in somewhat diagrammatic form illustrating the hydrostatic clutch according to the invention;

FIG. 2 is a cross-sectional view representing an enlarged detail of the region II of FIG. 1;

FIG. 3 is a sectional view of the central portion of the embodiment of FIG. 1; and FIG. 4 is a section taken along the line IV—IV of FIG. 3 partly broken away.

SPECIFIC DESCRIPTION

The hydrostatic clutch shown in FIGS. 1 and 2 and, of course, at least in part in FIGS. 3 and 4, comprises a drive shaft 11 which is secured to a suction chamber casing within which the pump body 13 of a positive displacement gear pump is disposed. The gears of the positive displacement gear pump and the casing have a relative angular displaceability through a limited angular stroke about an axis coaxial with the drive shaft 11.

The driving shaft of the clutch 10, i.e. the output shaft thereof, is the pump shaft 15 which is journaled coaxially with respect to the drive shaft 11 in the stationary clutch housing 16.

At the pressure side of the positive displacement gear pump 14, the pump body 13 is provided with a pressure passage or duct 17 in the form of an axial channel which extends over the entire length of the pump body 13, i.e.

between the openings 18 and 19 in the end faces of the pump body 13.

At the suction side of the positive displacement gear pump, the pump body 13 is provided with an intake or suction passage in the form of an axial channel 20 which likewise extends the full axial length of the pump body between the openings 21 and 22 in the two end faces of the pump body.

In the intermediate portion of the suction-space casing 12, a drumlike housing is formed in which the pump body 13 is embraced. This casing may be subdivided into parts and bolted together in a manner not shown to permit assembly.

The casing 12 is also formed in the suction space with an upstream partition 23 which is formed with a suction passage or opening 25 while the downstream partition or wall of the casing has a pressure passage or opening 26 and diametrically opposite this, a passage 27.

At the downstream side of the wall 24, the casing 12 communicates with the pressure opening 26 via a pressure passage 28 which via a hydrostatic shaft seal 29, e.g. as described in German patent documents DE-OS No. 20 43 844 and DE-OS No. 22 59 535, communicates with a high pressure line 30 in the clutch housing 16.

A secondary pump 31 is provided in the casing 12 and communicates with the flushing passage 27. This pump may be a centrifugal pump, i.e. need not be a positive displacement pump.

Upstream of the wall 23 within the casing 12, I provide an intake chamber 32 which is bounded by an annular end wall 33 at the upstream end of the casing. This annular end wall 33 is a frustoconical configuration and converges toward the output shaft 18 while terminating outwardly thereof so that an annular intake opening 34 is provided around the shaft 15 at the apex of the wall 33.

This annular opening should be as narrow as possible without markedly increasing the flow resistance of the hydrostatic clutch. The conical shape of the end wall 33 ensures that the intake chamber 32 will widen from the opening 34 toward the upstream wall 23 and the intake passage 25 therein.

The stationary housing 16 of the clutch is also formed upstream of the casing 12 with an intake compartment 36 which is defined at least in part by a fixed frustoconical partition 35 extending generally parallel to the outer surface of the end wall 33. The compartment 36 communicates with an intake pipe 37 extending into the hydraulic medium reservoir 47.

A low pressure line 38 also opens into the compartment 36.

The clutch is controlled, as can be seen structurally from FIG. 1 and diagrammatically from FIG. 3 by a throttle valve 39 which is fixedly located with respect to the housing 16.

As can be seen from FIG. 1, this throttle valve can have an axially shiftable slider 40 which moves in the valve housing or body 41 and can provide a substantially stepless control of fluid communication between low pressure line 38 and the high pressure hydraulic line 30. The displacement of the slider 40, therefore, allows stepless control of fluid passage between completely blocked and fully open position.

The fluid circulation path for control of the hydrostatic clutch runs from the intake compartment 36 of the clutch housing 16 through the intake opening 34, the intake chamber 32 and the suction opening 25, to the suction passages 20 of the pump body 13. The path continues via the piston gear displacement pump 14 to the pressure passage 17 of the pump body and thence to the pressure opening 26 of the casing, the pressure passage 28 thereof and past the hydrostatic shaft seal 29 of the latter to the high pressure line 30. The hydraulic fluid, under the control of the throttle valve 39 can return via conduit 38 to the intake compartment 36 (see the U.S. Pat. No. 3,896,912 for the principles of operation).

The reversal of rotation to the drive shaft 11 initially brings about an angular displacement of the pump body 13 with respect to the gears of the pump through the aforementioned limited angular stroke. As a consequence, the passages 20 and 17 are reversed in function. The pressure passage 17 in the pump body is thereby registered with the suction passage 25 and the flushing opening 27 of the casing 12, while the passage 20 is registered with the pressure opening 26 of the casing. The flow direction is thereby reversed through the positive displacement gear pump 14 and hence the direction of rotation of the pump shaft 15 is reversed.

The faces of the pump body 13 provided with the openings 18, 19, 21 and 22 thus form active valve surfaces relative to the surfaces of the walls 23 and 24 of the casing provided with the suction opening 25, the pressure opening 26 and the flushing opening 27.

A significant improvement in this effect in which these walls constitute active valve faces can be obtained when, as shown in FIG. 2, each of the openings of the pump body 13 mentioned previously is also provided a shear rings forming a seal as shown at 42 in which a metal ring in an appropriate cavity is urged against the opposing wall surface surrounding the respective opening by an "O" ring 42a or other resilient member under stress to serve as a clearance takeup member.

The system can be improved still further, especially as to the flushing operation and hence the cooling of the clutch and especially the positive displacement gear pump when the pump shaft 25 is formed with an axial bore 43 in the region of the gear pump. This axial bore can open radially at 44 into the compartment 36. At the opposite end of the axial bore, it can open into a cavity in the casing 12 while a radial bore 45 from this cavity in the casing forms a throttle passage which opens into the secondary pump 31. This provides a bypass flushing passage which remains open even during reversal or switching over of the pump body 13.

I have also found it to be advantageous, as shown in FIG. 3, to provide the clutch with a small hydraulic high pressure pump 46 which is fixedly located with respect to the housing 16 and is provided in parallel with the valve 39 and has its intake side connected to the low pressure passage 38 and its high pressure side connected to the high pressure line 30.

This low capacity high pressure pump serves to maintain a continuous displacement in the closed position of the valve 39, eliminates slip in the clutch and compensates for leakage.

From FIG. 4 it should be evident that the outer periphery of the pump body 12 can be provided with a radially extending riblike member 49 which has an angular width less than that of the broad angular groove 48 on the inner surface of the casing 12 which receive this rib. The groove and rib together form a limiting means determining the relative angular displacement of the pump body 13 and the casing 12 so that this relative angular displacement of about 100° can occur in the manner described. In the position shown in FIG. 4 the suction passage 20 is in registry with the suction opening 25. The pressure passage 17 of the body 13 is covered by the end wall 23 of the casing.

With the relative angular displacement of about 100°, the passage 17 can register with a second intake opening 259 and thus forms the intake side of the pump while the previous intake passage 20 is covered by the end wall 23 and assumes the function of the pressure side.

I claim:

1. In a hydrostatic clutch which comprises:
    a clutch housing;
    a drive shaft extending into said housing and rotatable about an axis therein;
    an output shaft extending into said housing;
    a casing rotatable in said housing about said axis and connected to one of said shafts;
    a positive displacement gear pump in said casing connecting to the other of said shafts;
    an intake compartment formed in said housing at one side of said casing;
    means in said casing defining a flow path from said compartment through said pump; and
    a throttle valve for controlling the flow of fluid along said path, the improvement wherein:
        said pump is formed with a pump body having an intake passage and a pressure passage;
        said casing is formed with openings communicating with said passages to define said path; and
        said casing and said body are formed with means enabling relative rotation of said body and said casing through an angle less than a full rotation whereby said passages are functionally reversed to enable switchover in the rotational sense of the output shaft upon reversal of the rotational sense of the input shaft, said casing being fixed on said input shaft and said output shaft being connected to gears cooperating with said body to form said pump, said pump having an upstream side in the region of said output shaft and said casing having a downstream side turned toward said input shaft, said casing defining with said output shaft at said upstream side, an annular intake opening around said output shaft of the smallest possible cross section consistent with no significant increase in the flow resistance along said path.

2. The improvement defined in claim 1 wherein said output shaft is formed with an axial bore in the region of said pump communicating with said compartment and opening at an intake side of a secondary pump for flushing fluid through said pump and said casing.

3. The improvement defined in claim 2, further comprising a throttle bore ahead of said secondary pump for fluid passing through said axial bore.

4. The improvement defined in claim 1 wherein the downstream side of said casing is formed with a flushing opening having a secondary pump and adapted to communicate with said positive displacement pump.

5. The improvement defined in claim 1 wherein said casing is formed at said upstream side with a frustoconical wall converging toward said annular opening.

6. The improvement defined in claim 1 wherein said casing is provided at said upstsream side with an additional intake compartment communicating with said opening.

7. The improvement defined in claim 6 wherein said additional compartment widens conically from said annular opening toward said pump.

8. The improvement defined in claim 1, further comprising a low capacity high pressure pump connecting said compartment with a high pressure line of said housing communicating with said pressure passage for leakage compensation.

9. The improvement defined in claim 8 wherein said high pressure pump is a pump which is fixedly positioned with respect to said housing and is connected in parallel to said throttle valve.

10. In a hydrostatic clutch which comprises:
    a clutch housing;
    a drive shaft extending into said housing and rotatable about an axis therein;
    an outlet shaft extending into said housing;
    a casing rotatable in said housing about said axis and connected to one of said shafts;
    a positive displacement gear pump in said casing connecting to the other of said shafts;
    an intake compartment formed in said housing at one side of said casing;
    means in said casing defining a flow path from said compartment through said pump; and
    a throttle valve for controlling the flow of fluid along said path, the improvement wherein:
        said pump is formed with a pump body having an intake passage and a pressure passage;
        said casing is formed with openings communicating with said passages to define said path; and
        said casing and said body are formed ith means enabling relative rotation of said body and said casing through an angle less than a full rotation whereby said passages are functionally reversed to enable switchover in the rotational sense of the output shaft upon reversal of the rotational sense of the input shaft, 11. The improvement defined in claim 10 wherein at least one of the valve surfaces is provided with shear rings bearing against the opposite surface around the respective opening to form a clearance-take-up.

12. In a hydrostatic clutch which comprises:
    a clutch housing;
    a drive shaft extending into said housing and rotatable about an axis therein;
    an output shaft extending into said housing;
    a casing rotatable in said housing about said axis and connected to one of said shafts;
    a positive displacement gear pump in said casing connecting to the other of said shafts;
    an intake compartment formed in said housing at one side of said casing;
    means in said casing defining a flow path from said compartment through said pump; and
    a throttle valve for controlling the flow of fluid along said path, the improvement wherein:
        said pump is formed with a pump body having an intake passage and a pressure passage;
        said casing is formed with openings communicating with said passages to define said path;
        said casing and said body are formed with means enabling relative rotation of said body and said casing through an angle less than a full rotation whereby said passages are functionally reversed to enable switchover in the rotational sense of the output shaft upon reversal of the rotational sense of the input shaft; and
        a reversible slide valve arrangement to which the pump body with its intake passage and its pressure passage and the clutch housing with a high pressure line and a low pressure line are connected.

* * * * *